Nov. 30, 1965  R. F. REITHEL  3,220,939
PHOTOCONDUCTOGRAPHY EMPLOYING MANGANESE COMPOUNDS
Filed April 8, 1963
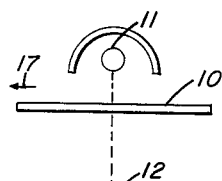
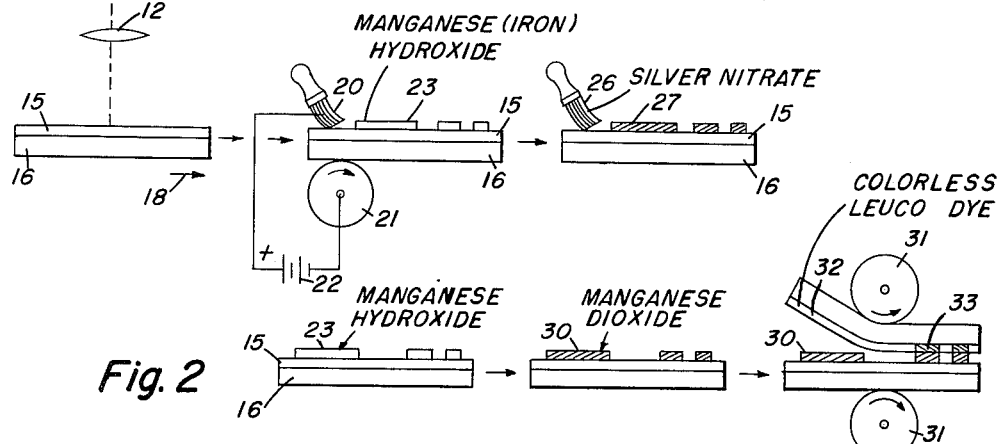
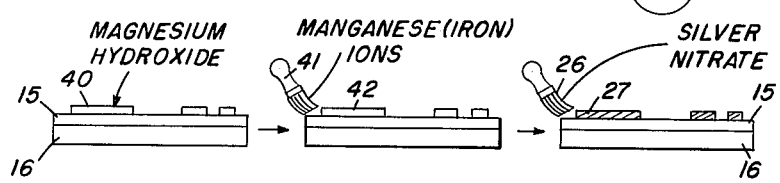
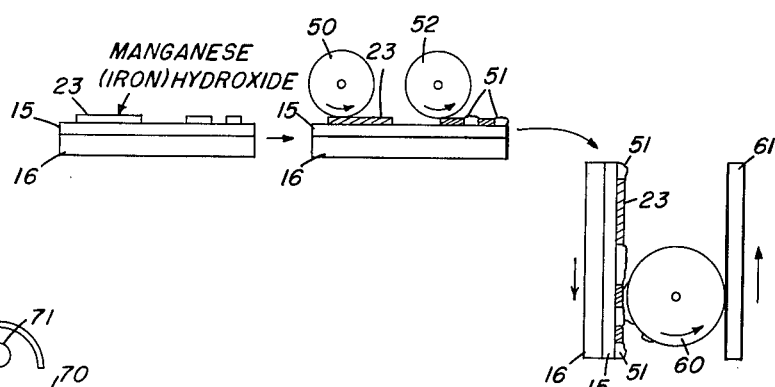
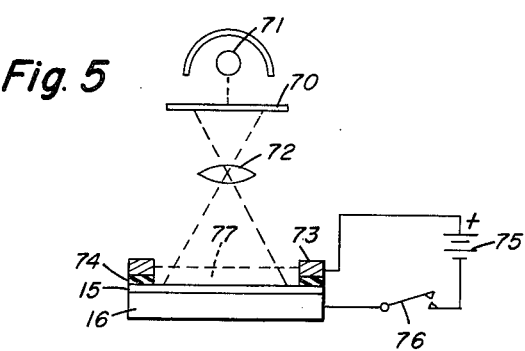
RAYMOND F. REITHEL
INVENTOR.
BY
ATTORNEYS United States Patent Office 3,220,939
Patented Nov. 30, 1965

3,220,939
PHOTOCONDUCTOGRAPHY EMPLOYING
MANGANESE COMPOUNDS
Raymond F. Reithel, Rochester, N.Y., assignor to Eastman Kodak Company, Rochester, N.Y., a corporation of New Jersey
Filed Apr. 8, 1963, Ser. No. 271,412
26 Claims. (Cl. 204—18)

This is a continuation-in-part of my application Serial No. 45,945, filed July 28, 1960, now abandoned.

This invention relates to photoconductography.

Photoconductography forms a complete image at one time or at least a non-uniform part of an image as distinguished from facsimile which at any one moment produces only a uniform dot. The present invention would be useful with facsimile but finds its greatest utility in photoconductography.

Cross reference is made to the following series of applications:

Serial No. 45,940, John W. Castle, Jr., "Photoconductography Employing Reducing Agents," filed July 28, 1960.

Serial No. 45,941, Raymond F. Reithel, "Photoconductolithography Employing Nickel Salts" (now abandoned), continuation-in-part Serial No. 120,863, filed June 7, 1961, now U.S. Patent 3,106,157.

Serial No. 45,942, Raymond F. Reithel, "Photoconductolithography Employing Magnesium Salts," filed July 28, 1960, now U.S. Patent No. 3,053,179.

Serial No. 45,943, Raymond F. Reithel, "Photoconductography Employing Spongy Hydroxide Images" (now abandoned), continuation-in-part Serial No. 120,035, filed June 27, 1961, now U.S. Patent No. 3,106,518.

Serial No. 45,944, Raymond F. Reithel, "Method for Making Transfer Prints Using a Photoconductographic Process," filed July 28, 1960.

Serial No. 45,946, Raymond F. Reithel, "Photoconductography Employing Molybdenum or Ferrous Oxide" (now abandoned), continuation-in-part Serial No. 120,036, filed June 27, 1961, now U.S. Patent 3,106,156.

Serial No. 45,947, Raymond F. Reithel, "Photoconductography Employing Cobaltous or Nickelous Hydroxide" (now abandoned), continuation-in-part Serial No. 120,037, filed June 27, 1961, now U.S. Patent 3,057,788.

Serial No. 45,948, Donald R. Eastman, "Electrophotolithography," filed July 28, 1960.

Serial No. 45,949, Donald R. Eastman, "Photoconductolithography Employing Hydrophobic Images," filed July 28, 1960, now U.S. Patent 3,152,969.

Serial No. 45,950, Donald R. Eastman and Raymond F. Reithel, "Photoconductography Employing Electrolytic Images to Harden or Soften Films," filed July 28, 1960, now U.S. Patent 3,106,516.

Serial No. 45,951, Donald R. Eastman and Raymond F. Reithel, "Photoconductography Employing Absorbed Metal Ions" (now abandoned), continuation-in-part Serial No. 120,038, filed June 27, 1961.

Serial No. 45,952, Donald R. Eastman and Raymond F. Reithel, "Photoconductography Employing Spongy Images Containing Gelatin Hardeners," filed July 28, 1960, now U.S. Patent 3,106,517.

Serial No. 45,953, John J. Sagura, "Photoconductography Employing Alkaline Dye Formation," filed July 28, 1960, now U.S. Patent 3,057,787.

Serial No. 45,954, John J. Sagura and James A. Van-Allan, "Photoconductography Employing Quaternary Salts," filed July 28, 1960.

Serial No. 45,957, Nicholas L. Weeks, "Photoconductography Involving Transfer of Gelatin," filed July 28, 1960, now U.S. Patent 3,103,875.

Serial No. 45,958, Donald R. Eastman, "Photoconductolithography Employing Rubeanates," filed July 28, 1960, now U.S. Patent 3,095,808.

Serial No. 45,959, Donald R. Eastman and Raymond F. Reithel, "Electrolytic Recording with Organic Polymers," filed July 28, 1960, now U.S. Patent 3,106,155.

Serial No. 46,034, Franz Urbach and Donald Pearlman, "Electrolytic Recording," filed July 28, 1960, now abandoned.

Serial No. 64,901, Franz Urbach, "Visually Controlled Photoconductography," filed October 25, 1960.

Serial No. 64,903, Franz Urbach, "Reversal Photoconductograph Processing," filed October 25, 1960.

Electrolytic facsimile systems are well known. Electrolytic photoconductography is also known and is described in detail in British 188,030 Von Bronk and British 464,112 Goldmann, modifications being described in British 789,309 Berchtold and U.S. 3,010,883 Johnson et al.

The present invention is related primarily to processes in which a manganese compound is electrolytically deposited and/or which is applied to a spongy form of photoconductographic image. The primary object of the present invention is to provide a photoconductographic process which produces good blacks, i.e. produces neutral tones of high optical density.

One preferred embodiment of the invention is a two-step process in which the manganese compound (e.g. manganese hydroxide) is deposited and is then treated with a reducible silver salt. In this continuation-in-part, a particularly useful form of this preferred embodiment is described in which manganese hydroxide and magnesium hydroxide and preferably also cobalt hydroxide are deposited simultaneously, and then are treated with a reducible salt, such as silver nitrate, to form a black absorption complex of manganese dioxide, silver and cobalt, the latter being in the form of a hydroxide or an oxide. This especially preferred embodiment differs from manganese species of the invention described in U.S. Patent 3,057,788 mentioned above in that the latter is a one-step process in which the silver, manganese, cobalt are deposited simultaneously and also differs by the deposit of magnesium hydroxide with the manganese and cobalt.

It is also an object of the invention to provide a photoconductographic method which has good control of tonal quality so that continuous tone prints may be made from negatives of average contrast. This high tonal quality is especially evident in the magnesium, manganese, cobalt species. Excellent continuous tone prints are obtained thereby.

Another object of the invention is to produce photoconductographic images which are stable to both heat and light. In another embodiment of the invention, the image is hydrophilic and when formed on a hydrophobic support it constitutes a particularly practical lithographic plate.

Another embodiment of the invention utilizes the manganese in the form of manganese dioxide which acts as an oxidizing agent to produce a dye image by oxidizing a colorless leuco dye to its colored form.

One form of the invention consists of the electrolytic formation in an imagewise pattern of faintly visible material which is essentially alkaline in nature. This material is converted chemically to a useful visible image by reaction with a solution containing both manganese and silver ions. The electrolytically deposited image may be manganese hydroxide, in which case it is swabbed with a solution of silver ions. Alternatively it may be magnesium hydroxide, in which case it is swabbed first with a solution of manganese ions and then with a solution of silver ions or it is swabbed with a solution containing both manganese and silver.

One particular object of the invention is best illustrated by comparison with the direct electrolytic deposition of silver which produces long tone scale and low densities and which therefore is not particularly suitable for the best continuous tone reproduction. By the present invention, on the other hand, a manganese ion is ultimately associated with the silver giving a much blacker image which forms an exceptionally fine continuous tone reproduction.

In a preferred embodiment of the invention, described in detail in this continuation-in-part, magnesium hydroxide and manganese hydroxide are electrolytically deposited and then treated with silver ions, i.e. with a silver salt olution. The magnesium hydroxide enhances the $D_{max}$ (maximum density) and the tonal qualities for intermediate tones in continuous tone reproductions; this is probably at least partly due to the sponginess of the magnesium hydroxide image. In this preferred embodiment, exceptionally good tonal qualities are obtained when cobalt ions are also present either in the silver salt solution or preferably in the electrolyte, to deposit as cobaltous hydroxide along with the magnesium hydroxide and manganese hydroxide. The cobalt ions aid in the formation of a manganese-cobalt-silver complex which is particuarly black.

Similar results can be obtained with various combinations of manganese, cobalt, and/or cerium ions in the silver nitrate toning solution. For example, a magnesium hydroxide control image can be toned with solutions of (1) manganese and silver ions, (2) cobalt and silver ions, (3) manganese, cobalt and silver ions, or (4) cerium and silver ions. As mentioned above, the electrolytically deposited control image can comprise various hydroxide images, such as (1) manganous hydroxide image, (2) magnesium hydroxide, (3) magnesium and cobaltous hydroxide, (4) magnesium and cerium hydroxide, and (5) ferrous hydroxide and various combinations of such hydroxides. The chemical toning is normally accomplished with a silver nitrate solution or a mixture of cobaltous and silver nitrate.

HUE AND TONE CONTROL

In these preferred embodiments using magnesium-manganese-cobalt hydroxide images and silver nitrate chemical toning thereof, there are a large number of ways to control the hue or tone of the image and a large number of ways to control the highlights and contrast.

It is the object of the special features about to be discussed to give images which have a desirable "cold" tone or blue-black appearance.

It is the object of other features to provide higher contrast and less "toe" so that the highlights are particularly clear. In the preferred embodiments of the invention, blue-black tone is obtained by using an organic dye (usually an acid dye) which will mordant to the hydroxide image material but will not mordant to the zinc oxide resin photoconductor on which the image was deposited by electrolysis. In other words, the image material is selectively dyed blue without increasing the background density. There are three forms of this hue control process. In the first form (form 1) an additional step is performed between the electrolytic step and the chemical step, the intermediate step being the application of a dye bath followed by rinsing just prior to applying the silver nitrate toning bath. In the second form (form 2) the dye is incorporated in the silver nitrate toning solution so that the dyeing and toning of the image are performed at the same time. In the third form (form 3) the dye is incorporated in the electrolytic developer so that the hydroxide image is dyed as it is formed.

The blue toning dyes discussed below work to some degree in all forms of this improved embodiment of the invention, but for each particular form of the invention, somes of the dyes are definitely much better than others.

The dyes which worked well in the pretoning step (form 1 above) include the following:

(I) (a)

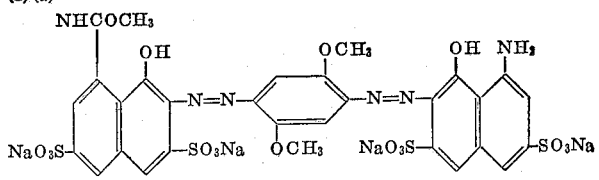

8-acetamido-3,6-disulfo - 2 - [2,5-dimethoxy-4-(8-amino-3,6-disulfo-1-hydroxy-2-naphthylazo) phenylazo]-1-naphthol, tetrasodium salt.

(b) Erio Fast Cyanine S (Shultz Dye No. 1187).
(c) Nigrosine (Schultz Dye No. 986).
(d) Pontacyl Blue Black SX (Schultz Dye No. 299).
(e) Calco Alizarine Blue Black (Schultz Dye No. 240).
(f) Alizarine Blue Black (Schultz Dye No. 1195).
(g) Superchrome Black B Extra (Schultz Dye No. 242).
(h) Pontachrome Black TA (Schultz Dye No. 2417).
(i) Niagara Blue G (Schultz Dye No. 497).
(j) Alizarine Sapphire BN (Schultz Dye No. 1187).
(k) Alizarine Celesto (Schultz Dye No. 1200).
(l) Alizarine Viridine FF (Schultz Dye No. 1193).

The dyes which produced the most desirable results with this system were with those having Schultz dye numbers 497, 1195, 1187, and 1200 (dyes Ii, f, j, and k above).

Mixtures of some of these dyes produced excellent results, even with dyes which alone gave poor tone results. The concentrations of some of these dyes were important in producing various hues. The dye concentrations used were from 0.005% up to 0.1% with the above system. The dye mixture which produced the best results with form 1 described above was a dye solution containing 0.04% Niagara Blue G, 0.02% Alizarine Viridine and 0.02% Alizarine Celesto.

There was little change in sensitometric characteristics produced by mordanting these dyes to the image material. The pH of the dye solution is preferably about 6.0.

The dyes which worked well when placed in the AgNO$_3$ toner (form 2 above) include the following:

(II) (a) Dye (a) under form 1.
(b)

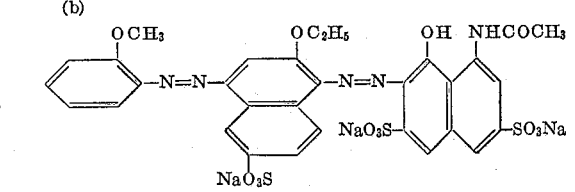

8-acetamido-3,6-disulfo-2-[2-ethoxy - 4-(2-methoxyphenyl-azo)-6-sulfo-1-naphthylazo]-1-naphthol, trisodium salt (c)

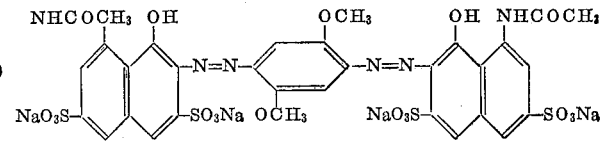

1,4-dimethoxybenzene-2,5 - bis(8-acetamido-3,6-disulfo-2-azo-1-naphthol), tetrasodium salt.

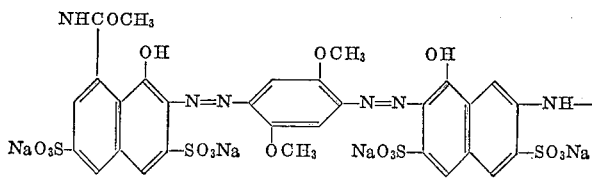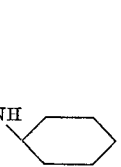

8 - acetamido-3,6-disulfo-2-{2,5-dimethoxy-4-[8-(4-anilino-6 - chloro-1,3,5-triazinyl-2-amino)-3,6-disulfo-1-hydroxy-2-naphthylazo]phenylazo}-1-naphthol, tetrasodium salt.

These dyes are somewhat stable in the presence of 5% silver nitrate ($AgNO_3$) solution. Dyes II*a*, *c*, and *d* reacted with the silver to produce a change in color of the dye but in each case the change was advantageous to the toning achieved by this method. Dye II*b* is very stable in the presence of the 5% $AgNO_3$, producing little shift in color. Dye II*b* mixed with dye II*a* produced an excellent neutral tone, for example, a solution containing a mixture of 90 ml. of 5% $AgNO_3$ and 0.07% dye II*a* and a mixture of 30 ml. of 5% $AgNO_3$ and 0.05% dye II*b*.

Since the pH of the silver-dye solution tends to increase slightly on keeping, it is preferred that the solution be aged before use and the pH adjusted, for example, with 2,2-iminodiethanol to a pH of 5.2.

The preferred concentration range of dyes in the silver-nitrate solution is from 0.005 to 0.1% by weight. Higher concentrations of dye can be used but show no improvements or additional advantages.

The useful concentration range of the silver nitrate solution is from 0.5 to 30% by weight with variations in density and contrast, the preferred range being between 3 and 5% $AgNO_3$.

As mentioned in form 3 above, the dye or dye mixtures, such as those described above, can also be included in the electrolyte developer before applying the silver nitrate toning step. The dye deposited during post-exposure electrolytic development is mordanted to the hydroxide image as it is formed.

In this preferred manganese-magnesium-cobalt hydroxide system, with or without the blue dye feature, it is desirable to have clear highlights and relatively high contrast. According to the preferred form of the invention providing this additional advantage, one more metallic ion is added to the electrolyte which additional ion is selected from chromic, aluminum, bismuth, uranium, thorium or combinations of these. That is, the electrolyte contains magnesium and either manganeous, cobaltous, ferrous, or cerous ion, to which is added as a "toe-cutting agent" from 0.005% to 0.5% by weight of chromium or, less preferably, aluminum, bismuth, uranium, or thorium. It is noted that ferric ions also produce the "toe-cutting" (i.e. clearing of the highlights) but the ferric hydroxide in the image interferes with the formation of a black absorption complex with the silver from the silver nitrate toning solution. It is best to use magnesium, manganous, cobaltous and chromic ions in the electrolyte.

On the other hand, as pointed out in the parent application, there are some special advantages in the embodiment of the invention which has iron ions associated with the manganese ions so that a manganese-iron complex, for example a manganese-iron hydroxide, is formed, and this is even better than the embodiments which simply use manganese salts. This improvement is true whether the manganese-iron hydroxide is electrolytically deposited and then treated with a silver ion or whether it is used in lithography or whether a magnesium hydroxide image is first formed and the iron-manganese complex is applied to the magnesium hydroxide before treatment with silver. The particular advantages of adding the iron include the following.

The final image is less susceptible to finger printing or to treatment with mild oxidants or acids such as chlorine water or acetic or maleic acids. In fact with the iron as well as the manganese present, the final image is not particularly affected when subjected to solutions which are bleaches for the dyes used in the photoconductive layer.

Also the prints containing the iron as well as the manganese and silver radicals have higher reflection densities for a given exposure than the simple manganese dioxide silver complex, which is less glossy.

The above-discussed embodiment with cobalt in the electrolyte appears to have advantages similar to these iron embodiments, plus the advantages due to the presence of magnesium and the advantages due to the manganese-cobalt-silver complex in the final image. In this complex, it is believed that the silver ion is reduced to silver, the manganese hydroxide is oxidized to manganese dioxide and the cobaltous hydroxide is oxidized to cobaltic hydroxide or cobalt oxide or partly to each.

Thus the present invention takes many forms. In one of its simplest forms photoconductography is employed to distribute imagewise manganese ions which are then reacted with silver nitrate. Preferably both manganese and iron ions are so distributed. With or without the iron ion, manganese hydroxide on a hydrophobic photoconductive layer forms a very useful litho plate. As mentioned above, one of the embodiments of the invention has the manganese image in the form of manganese hydroxide which is then converted to manganese dioxide suitable for the oxidation of leuco dyes and the like.

The invention and its various embodiments will be more fully understood from the following description when read in connection with the accompanying drawing in which:

FIG. 1 is a schematic flow chart of a simple embodiment of the invention.

FIGS. 2 and 3 similarly illustrate alternative embodiments of the invention.

FIG. 4 similarly illustrates the application of the invention to offset lithography.

FIG. 5 illustrates the production of a continuous-tone print according to a preferred embodiment of the invention.

In FIG. 1 a transparency 10 is illuminated by a lamp 11 and an image of the transparency 10 is focused by a lens 12 on a zinc oxide-resin layer 15 carried on a conducting support 16. As the transparency 10 moves to the left as indicated by arrow 17, the zinc oxide layer 15 moves to the right as indicated by the arrow 18 synchronously with the image focused thereon. Immediately following exposure, the zinc oxide layer 15 with its image-wise distribution of variations in conductivity is subjected to an electrolytic bath by brushing with a brush 20 held positive relative to a metallic roller 21 by a D.C. source indicated schematically at 22. According to the embodiment of the invention here illustrated, manganese hydroxide, or in the more complex examples discussed below a complex manganese-iron hydroxide, is deposited to form the photoconductographic image 23 directly on the layer 15. According to the preferred embodiment of this continuation-in-part application, magnesium hydroxide is deposited with the manganese. Also cobalt may replace the iron so that a manganese-cobalt hydroxide is deposited with magnesium hydroxide. A silver nitrate solution is then applied by a brush 26, which reacts with the manganese, manganese-iron or manganese-cobalt to form an extremely black image 27.

In an alternative embodiment of the invention illustrated in FIG. 2, the manganese hydroxide image 23 is oxidized to form a manganese dioxide image 30. This oxidation can result from simply letting the hydroxide image stand or it can be enhanced by putting certain compounds in the electrolyte before the electrodeposition. Upon the electrolytic formation, these compounds act either as mild oxidizing agents toward the manganese hydroxide or they catalyze the auto-oxidation of this material. One cannot be sure which of these two mechanisms is actually present. A suitable compound for increasing the oxidation is benzoin-α-oxime. This manganese dioxide image 30 is then pressed by rollers 31 into contact with a gelatin layer 32 containing a colorless leuco dye. The manganese dioxide oxidizes the dye to form an image 33 in the layer 32. Excellent tonal quality is obtainable by this embodiment.

In FIG. 3 the photoconductographic process involves the electrolytic deposition of a magnesium hydroxide image 40. This is then treated by a brush 41 to apply a solution containing manganese ions and preferably also iron ions which ions are absorbed to form an imagewise distribution of manganese compound in the image 42. As in FIG. 1, this manganese containing image 42 is then treated with silver nitrate from a brush 26 to form a complex salt 27. As pointed out in connection with FIG. 1, the manganese can be deposited with the magnesium hydroxide.

In FIG. 4 the manganese hydroxide, manganese-iron hydroxide or manganese-cobalt-magnesium hydroxide image 23 is electrolytically deposited as in FIG. 1. The zinc oxide layer 15 is hydrophobic and this hydroxide image is hydrophilic. The surface is then wet by an aqueous fountain solution applied by a roller 50 and then greasy ink 51 is applied by a roller 52 to the areas of the zinc oxide layer 15 which are not covered by the wet hydrophilic image 23.

By standard lithographic methods the greasy ink 51 is offset to a drum or rubber blanket 60 and thence it is printed on a receiving sheet of paper 61.

Thus in FIGS. 1 and 2 the manganese improves the tonal qualities and blackness of the silver particularly when viewed by reflected light and in FIG. 4 it improves the hydrophilic qualities of the photoconductive image. Furthermore, both of these improvements are further enhanced by the presence of iron.

In FIG. 5 a continuous-tone negative 70 is illuminated by a lamp 71 and an image is focused by a lens 72 on the surface of a photoconductor 15 carried by a conductive support 16. A stainless steel rectangular frame 73 rests on the photoconductor 15 and is separated therefrom by an insulating gasket 74 made of plastic. By closing the switch 76, a potential difference can be supplied from a D.C. source indicated schematically at 75 between the photoconductive layer acting as a cathode and the stainless steel rim 73 acting as the anode. When transparent electrolytes are used in the area 77, the development may be simultaneous with the exposure merely by closing the switch 76 during exposure. When zinc oxide in resin is used as the photoconductor, the persistence of conductivity of such photoconductors may be utilized by making the exposure first and then pouring the electrolyte 77 into the frame and closing the switch 76 to provide electrolytic development for any desired period. Such post-exposure development is used with opaque or dense electrolytes including those which have a blue dye therein for cold toning as discussed above.

Examples of the invention are as follows:

*Example 1*

A dye-sensitized zinc oxide layer on conducting support was exposed through a 0.3 density increment step-wedge to an intensity of 400 ft. candles for 5 seconds. The conductive image was developed electrolytically using a viscose sponge brush electrode, held at 80 volts positive with respect to the zinc oxide layer, with a 1% magnesium nitrate [$Mg(NO_3)_2$] solution and ten-strokes (of the brush) development. The faintly visible hydrous magnesium oxide or hydroxide image (40) of FIG. 3 was treated chemically with a solution consisting of 2.87% manganese nitrate and 3.39% silver nitrate, adjusted to a pH of 6.0 with sodium hydroxide, to produce a black image, in the form of and relative to the amount of the alkaline magnesium hydroxide image on the surface of the photoconductor.

*Example 2*

A dye-sensitized zinc oxide layer was exposed through a 0.3 density increment step-wedge to 400 ft. candle intensity for 5 seconds. The resulting conductive image was developed electrolytically using a viscose sponge brush electrode (20), held at 80-volts positive with respect to the zinc oxide layer, with a 1% manganous nitrate solution, and ten-strokes development. A faint yellowish-brown image of partially oxidized manganous hydroxide was produced on the surface of the photoconductor. This image was converted to the black adsorption complex of manganese dioxide and reduced silver, chemically, by treating it with a 5% silver nitrate solution, as in FIG. 1.

*Example 3*

A dye-sensitized zinc oxide layer was exposed through a positive line film to 15 ft. candle illumination for 10 seconds. The resulting conducting image was developed electrolytically using a viscose sponge brush electrode (20), held at 60 volts potential, positive with respect to the zinc oxide layer, with a 1% manganous nitrate solution and 20-strokes development. This image material was dried by blotting with a print blotter and treated with a solution of 1:7 water diluted Repelex fountain solution and mounted on the master drum of the Addressograph-Multigraph Model 1250 lithographic press as in FIG. 4. Several hundred prints of good quality were made.

*Example 4*

A dye-sensitized zinc oxide layer on conducting support was exposed for 2 seconds through a 0.3 density increment step-wedge to 400 ft. candle illumination. The resulting conducting image was developed electrolytically with a viscose sponge brush electrode (20), held at 80 volts positive with respect to the zinc oxide layer, with a solution of 25 ml. 1% $Mn(NO_3)_2$ plus 25 ml. 3A alcohol and using 20-strokes development. The resulting manganese hydroxide and/or hydrated oxide image 23 was dried and allowed to oxidize aerially for a few seconds, as in FIG. 2. The resulting oxidizing image 30 was treated with an acid solution of 1% Solvat Blue O. The manganese dioxide, in the body of the hydrated oxide image, oxidized the colorless Solvat Blue O to the blue dye form.

*Example 5*

The amount of oxidation obtainable with this image is dependent upon the amount of the manganous hydroxide and/or hydrated oxide which becomes converted to the manganese dioxide by the air. It is also possible to enhance the oxidation of this material by putting compounds in with the manganese developer before electro-deposition. Upon electrolytic formation, these compounds act as (a) mild oxidizing agents toward the manganese hydroxide or (b) catalyze the auto-oxidation of this material. An example of such a compound is benzoin α-oxime. Which of the above two mechanisms this compound performs is not known as yet, but the result is the same.

*Example 6*

The embodiment shown in FIGS. 1 and 3 is not limited to the formation of the black complex of manganese dioxide and silver on the surface of the photoconductor only. For example, the manganese and silver ions can be coated in a suitable binder on a paper support as a separate recording layer. The recording layer can be placed face down on the surface of a previously exposed zinc oxide layer and a metallic foil counter electrode (anode) placed on the back of the paper. Current produced by the exposed photoconductor will cause a localized alkaline pH shift at the interface between the recording layer and the photoconductor's surface, in the exposed areas, thus producing the required alkalinity in an imagewise manner to cause the precipitation of the manganese dioxide-silver complex in the surface of the separate recording layer.

*Example 7*

A dye-sensitized zinc oxide photoconductive layer was exposed through a 0.3 density increment photographic step-wedge for 5 seconds to 400 ft. candle tungstein illumination. The resulting conducting image was developed electrolytically using a solution of 0.75% ferrous sulfate heptahydrate plus 0.50% of manganous nitrate hexahydrate contained in a viscose sponge brush electrode (20), held at 80 volts potential, positive with respect to the zinc oxide layer and using ten-strokes development. The excess developer solution was removed from the zinc oxide surface with an absorbent tissue. The gray-green complex hydroxides of manganese and iron, which had formed by electrolytic co-deposition, was bathed with a solution of 5% silver nitrate as in FIG. 1. The resulting black adsorption complex formed between the manganese-iron oxides and the reduced silver on the photoconductor's surface had a reflection density corresponding to the zero density step on the wedge, of 1.4, which is excellent.

*Example 8*

As another example of this invention, a dye-sensitized zinc oxide layer was exposed for 5 seconds, through a positive "resolving-power" transparency, to 15 ft. candle tungsten illumination. The resulting conducting image was developed electrolytically using a solution of 0.75% ferrous sulfate heptahydrate plus 0.50% manganous nitrate hexahydrate contained in a viscose sponge brush electrode (20), held at 80 volts potential, positive with respect to the zinc oxide layer and using ten-strokes development. The excess developer was removed from the surface of the zinc oxide with an absorbent tissue. The surface of the zinc oxide containing the imagewise distribution of the hydrophilic, complex hydroxides (or hydrous oxides) of manganese and iron 23 was bathed with a 1:7 ratio of Repelex:water solution and mounted on the drum of a Multilith No. 1250 press using Van Son Black Ink No. 40904 and a 1:32 dilution of Repelex on the fountain rollers, all as shown in FIG. 4. Four-hundred copies were obtained using this photoconmaster for lithography.

*Example 9*

As another example of this invention, an image was formed in or on a separate recording sheet instead of directly on the zinc oxide surface. A dye-sensitized zinc oxide layer was exposed for 5 seconds, through a negative resolving power pattern transparency, to 400 ft. candle tungsten illumination. A sheet of medium porosity paper which had previously been dipped in a solution of 0.75% ferrous sulfate heptahydrate plus 0.50% manganous nitrate hexahydrate, was rolled into contact with the previously exposed zinc oxide layer. An aluminum-foil counter electrode (anode) was rolled onto the back of a separate recording layer to produce a sandwich. Eighty-volts potential was applied across the sandwich for 5 seconds and the separate recording layer was removed. The localized pH shift at the (zinc oxide-separate recording layer) interface caused the hydrated oxides and/or hydroxides of manganese and iron to precipitate throughout the body of the paper in an imagewise manner. (Some also was deposited on the zinc oxide surface.) The recording paper was bathed in a 5% solution of silver nitrate to intensify the image material by forming the black absorption complex. The paper was rinsed in distilled water and dried.

*Example 10*

A sheet of the photoconductive material was exposed for 20 seconds to 15 ft. candle tungsten radiation incident upon a silver step tablet in contact with the photoconductive surface, and then electrolytically developed with an aqueous solution consisting of 2 ml. of a 50 percent solution of manganous nitrate in 100 ml. distilled water. The print surface was rinsed, wetted-out and inked as in FIG. 4. The areas which had been exposed for 150 ft. candle seconds were ink-repellent, whereas the areas which had been exposed for 5 ft. candle seconds, or less, were ink-receptive.

*Example 11*

A sheet of the photoconductive material was exposed for 10 seconds to 15 ft. candle tungsten radiation incident upon a high contrast positive transparency in contact with the photoconductive surface and then electrolytically developed with an aqueous solution containing 2 ml. of a 50 percent manganous nitrate solution per 100 ml. of distilled water and 0.5 percent, by weight, manganous sulfate. After rinsing the print surface with water, a 5 percent silver nitrate solution was applied. A black image, presumably a metallic silver and manganese dioxide complex, was formed only in the areas containing the electrolytic deposit. After rinsing and "wetting-out" with 1:7 Repelex, this print was run on the Multilith No. 1250 press, as in FIG. 4. From this master, 50 copies were produced.

*Example 12*

Analogous redox reactions can occur by substituting cerous, ferrous or cobaltous ions for the manganese ion in the aforementioned mechanism (the oxidation of the manganous ions by silver ions), using the alkaline magnesium hydroxide image material. It should be understood that any combination of the above four ions can be utilized with the silver nitrate in this reaction involving magnesium hydroxide. All such reactions give deep black products that are said to be adsorption compounds between noble metals and the higher oxides of non-noble metals and cannot usually be distinguished from one another by their external appearance, if prepared in the conventional manner (e.g. in test tube or on spot test plates). The photoconductographic images obtained with these various metals may vary in tone from a warm black to a cold black tone.

Since the cerous, ferrous and cobaltous ions do not form sufficiently basic hydroxides by themselves as the manganese does, they must be either applied to an alkaline hydroxide image in the chemical toning step with silver, or be co-deposited with an alkaline hydroxide material followed by a subsequent chemical complex formation with silver ions.

A dye-sensitized zinc oxide layer was exposed for 5 seconds through a 0.3 density increment step-wedge to 400 ft. candle tungsten illumination. The resulting conducting image was developed electrolytically using a solution consisting of 0.8% by weight of magnesium nitrate hexahydrate contained in a viscose sponge brush electrode. The brush electrode was held at 70 volts potential, positive with respect to the zinc oxide layer, and development was effected by brushing the electrolyte across the zinc oxide layer. The excess developer was removed from the surface of the zinc oxide layer by means of an absorbent tissue. The resulting, faintly visible, electrolytically formed magnesium hydroxide (or hydrous oxide) material was made usefully visible by bathing the image material with a solution consisting of 3% cerous nitrate hexahydrate plus 3% silver nitrate to form the black adsorption complex of ceric hydroxide and reduced silver.

Example 13

A magnesium hydroxide image was formed electrolytically on the surface of a zinc oxide layer. This faintly visible image material was bathed with a solution consisting of 3% cobaltous nitrate hexahydrate and 3% silver nitrate to form the black adsorption complex between cobaltic hydroxide and reduced silver in the body of the magnesium hydroxide material.

Example 14

A dye-sensitized zinc oxide layer was exposed and developed electrolytically using a solution consisting of 0.75% cobaltous nitrate hexahydrate and 0.25% magnesium nitrate hexahydrate contained in a viscose sponge brush electrode held at 70 volts potential, positive with respect to the zinc oxide layer. The resulting light blue hydrous oxide of cobalt in the magnesium hydroxide material was dried with an absorbent tissue and bathed with a 5% solution of silver nitrate to form the black adsorption complex in an imagewise patern.

Example 15

A photocon sheet of dye sensitized zinc oxide-resin on an aluminum foil-paper laminate was exposed to a 0.3 density increment step-wedge projected 1:1 from an enlarger using 50 f.c. (foot candle) intensity and developed simultaneously with exposure by means of a stainless steel-frame type developer retainer having a Teflon insulating gasket around the bottom edges of the frame as shown in FIG. 5. The zinc oxide layer was made the cathode and the frame acted as the anode. The developer used consisted of the following components:

0.5% $Mn(NO_3)_2 \cdot 6H_2O$ (manganous nitrate hexahydrate)
0.25% $Co(NO_3)_2 \cdot 6H_2O$ (cobaltous nitrate hexahydrate)
5.0% $Mg(NO_3)_2 \cdot 6H_2O$ (magnesium nitrate hexahydrate)
pH=3.2

Thirty-volts potential was applied during a 4.5 second simultaneous exposure and development time. The resulting combined hydroxide images were dried with absorbent tissue and then swabbed with a 5% solution of $AgNO_3$ to form the black absorption complex between silver-manganese dioxide and cobalt oxide. The print was rinsed briefly in water and blotted dry by means of a photographic print blotter. The density was 1.45 and the gamma was 1.63. After lacquering the print with an acrylic ester resin involatile organic solvents (Krylon), the maximum density was raised to 1.80 and the gamma increased to 1.75.

Example 16

A sheet of dye sensitized zinc oxide-resin on an aluminum foil-paper laminate was exposed for 5 seconds through a 0.15 density increment step-wedge in contact using 50 f.c. intensity. The stainless steel frame developer retainer described in Example 15 was placed on top of the zinc oxide layer to "frame in" or encompass the exposed areas. The following electrolytic developer solution was poured into the frame retainer which was made the anode: (The zinc oxide layer acted as the cathode.)

0.5% $Mn(NO_3)_2 \cdot 6H_2O$
0.6% $Co(NO_3)_2 \cdot 6H_2O$
5.0% $Mg(NO_3)_2 \cdot 6H_2O$
pH=3.2

Development was then carried out for 10 seconds at 20 volts potential. The developer was removed from the frame and the excess developer rinsed from the print surface with water. The electrolytically-formed hydroxides on the surface of the print were then developed chemically by applying a 5% $AgNO_3$ solution and allowing reaction to occur for 10 seconds. The excess silver nitrate was rinsed from the print surface with water and the print dried and lacquered as in Example 15. Maximum density was 1.9; gamma was 1.85. An exposure of only 35 f.c.s. (foot candle seconds) was necessary to produce a density of 1.0 with this material and process.

Example 17

A dye-sensitized zinc oxide photocon material was exposed to a negative and developed with the following solution as in Example 16:

2.0% $Mn(NO_3)_2 \cdot 6H_2O$
1.0% $Co(NO_3)_2 \cdot 6H_2O$
3.0% $Mg(NO_3)_2 \cdot 6H_2O$
pH=3.2

This Example 17 also gave excellent quality prints.

In the last three examples, various concentrations of the same ingredients are used. In the most preferred embodiment, the electrolyte or developer contains 0.05 to 5% of the manganese salt, 0.025 to 1% of the cobalt salt and 0 to 10% of the magnesium salt. In the cases where no magnesium salt is present, these examples are similar to Examples 7, 8 and 9 except that the iron is replaced by cobalt. Similarly, when cobalt is substituted for part but not all of the manganese in Example 12, the process is similar to Examples 15, 16, and 17. In the last three examples as in others in which the chemical toning step involves the application of a solution of silver salt, the concentration of the latter is not critical but is preferably 0.5 to 20% by weight ($AgNO_3$) and the optimum concentration is 3 to 5%.

The following Examples 18 to 23 inclusive illustrate various arrangements for cold-toning by incorporating a blue dye into the image at some stage.

Example 18

A sheet of dye-sensitized ZnO in a Goodyear Pliolite S-7, resinous binder (a 70:30 styrene-butadiene copolymer), coated on an aluminum foil paper laminate, was exposed to a photographic continuous tone negative projected from a Kodak "A" enlarger using 35 ft.-c. tungsten illumination. After a 10-second exposure, the latent photocon image was developed by means of a stainless steel developer-retainer frame containing an electrolytic developer composed of 0.5% $Mn(NO_3)_2 \cdot 6H_2O + 0.6\%$ $Co(NO_3)_2 \cdot 6H_2O + 5\%$ $Mg(NO_3)_2 \cdot 6H_2O$ using 12-sec. development time and 20 volts potential across the cell. The ZnO layer was the cathode; the frame developer-retainer the anode. The resulting hydroxide image on the ZnO layer was bathed with a solution of 0.02% Erio Fast Cyanine S dye (dye Ib above). The print was then rinsed with distilled water and chemically toned with 5% $AgNO_3$ solution to form the black adsorption complex between $MnO_2$ and reduced silver in the body of the material. The dye increased the neutrality of the density in the print when this print was compared with a similar one produced as above, but toned only with $AgNO_3$ (no dye bath). The silver nitrate was rinsed from the print surface with distilled water and the print dried by blotting.

Example 19

The above procedure in Example 18 was repeated using a mixture of 0.04% Niagara Blue G (dye Ii above)+0.02%

Alizarine Viridine FF (dye Il above)+0.02% Alizarine Celesto (dye Ik above). The result was the production of an image having a cold or neutral tone similar to that produced by silver halide photography, using the same negative for exposure and conventional photographic processing.

Example 20

A zinc-oxide-resin photocon layer was exposed as in Example 18 but the development was carried out simultaneously with exposure for 8 seconds using the same developer solution as that employed in Example 18. The layer containing the hydroxide image material $$[Mn(OH)_2 + Co(OH)_2]$$

was rinsed with distilled water. The following toning solution which was aged 10 days and the pH adjusted to 5.2 with 2,2'-iminodiethanol was then applied to produce a desirable image:

90 cc. of 5% $AgNO_3$+0.07% dye I$a$
30 cc. of 5% $AgNO_3$+0.05 dye II$b$

The print was then rinsed in distilled water to remove the excess $AgNO_3$-dye solution and the print dried. The result was the production of an image having a cold or neutral tone similar to that produced by silver halide photographic materials, using the same negative for exposure and conventional photographic processing.

*Example 21*

The exposure and development of a photocon material was carried out as in Example 18 but the image material was toned with a solution of 5% $AgNO_3$+0.05% dye I$a$ (aged 3 days and pH adjusted to 5.2 with 2,2'-iminodiethanol).

In each case the mordanted dye produced an improvement in cold or neutral toning by the $AgNO_3$ reaction with the Mn and Co hydroxides.

*Example 22*

The exposure and development of a photocon material was carried out as in Example 18 except that dye I$b$ was placed in the electrolyte developer, and the resulting hydroxide image was toned with a solution of 5% $AgNO_3$. The final print showed an improvement in tone compared with that in which no dye was added to the electrolyte.

*Example 23*

The procedure described in Example 22 was repeated except using 0.05% of dye I$a$ in the electrolytic developer instead of dye I$b$. The final print showed a similar improvement.

Other addenda can be added to the developer solutions such as that described in Example 18 above to impart a neutral tone to the final image though the effect is not as great as with the dye systems. For instance, the addition to the developer of 3-mercapto-1,2,4-triazole, 2-thiobarbituric acid, 2-mercapto-thiazoline, 8-[3-(dimethyldithiocarbamato) propyl]-N-methylpyridinium paratoluenesulfonate, 5-mercapto-1-phenyltetrazole, 5-methyloxazole-2-thiol, or 7,13-dithianonadecane-1,19-bis(pyridinium paratoluenesulfonate) in concentrations of from 0.01 to 0.05% produced improved tones with increases, in most cases, in density and gamma. Sulfur-containing organic compounds of this type which are also useful in imparting neutral tone to the final photocon image are described in Tregillus-Rasch U.S. Patent 3,017,270 and in Gilman-Jones-Rasch U.S. application Serial No. 141,036, now abandoned.

The following Examples 24 to 28 inclusive illustrate various materials which, when added to the electrolyte, produce clearer highlights.

*Example 24*

A sample of zinc oxide-resin photocon layer was exposed for 10 seconds at 60 ft.-c. illumination through a 0.3 log E density increment step-wedge, was then developed for 10 seconds in the Mn-Co-Mg electrolytic developing composition described in Example 18 above, but containing in addition 0.05% $Cr(NO_3)_3 \cdot 9H_2O$ (chromic nitrate nonahydrate) with 20 volts potential across the cell, and was chemically toned with 5% $AgNO_3$ solution as described in Example 18. A control image was made using no $Cr(NO_3)_3$ in the developer. The chromium salt produced a toe-cutting effect in the sensitometric curve compared to the control and the effect was more pronounced using a concentration of 0.10% $Cr(NO_3)_3 \cdot 9H_2O$ in the developer.

*Example 25*

A procedure similar to Example 24 was used in developing and toning an exposed photocon layer but using 0.01% $Al(NO_3)_3 \cdot 9H_2O$ (aluminum nitrate nonahydrate) in the developer instead of the chromium salt. The aluminum salt produced a toe-cutting effect in the sensitomertic curve similar to that with the chromium salt. At 0.10% $Al(NO_3)_3 \cdot 9H_2O$ the effect was greater.

*Example 26*

The procedure in Example 24 was repeated but using 0.01% $UO_2(NO_3)_2 \cdot 6H_2O$ (uranyl nitrate hexahydrate) in the developer. The toe-cutting effect was similar to that for the chromium and aluminum salts. At higher concentrations of the uranium salt, e.g., 0.2%, the effect was enhanced.

*Example 27*

The procedure in Example 24 was repeated but using 0.01% and 0.10% $Th(No_3)_4 \cdot 12H_2O$ (thorium nitrate dodecahydrate) respectively. Toe-cutting effects were similar to those produced by the chromium, aluminum and uranyl salts.

*Example 28*

The procedure in Example 24 was repeated but using 0.01% and 0.5% $Bi(NO_3)_3 \cdot 6H_2O$) bismuth nitrate hexahydrate) respectively. The toe-cutting effect of $Bi(NO_3)_3$ was found to be similar to those described in Examples 24 to 27.

Silver nitrate is specified in many of these examples, but other soluble silver salts such as citrate, lacate and sulfate can, of course, be used instead.

It is also feasible to carry out the complex formation in these reactions with other soluble salts of noble metals besides silver as the toner; namely gold, palladium and platinum. However, because of the high acidity of many of the solutions of the salts of these metals, they form the complex reluctantly with the photocon image materials, even though they do work successfully in experiments in which strong bases are employed.

Having given various examples of my invention and preferred arrangements thereof, it is pointed out that the invention is not limited to these specific examples but is of the scope of the appended claims.

I claim:

1. In a photoconductographic process in which an image pattern of variations in electrical conductivity is produced in a photoconductive layer, the steps comprising electrolytically depositing on the surface of said layer an imagewise distribution of hydroxide containing positive manganese ions and reacting said ions with a water soluble silver salt.

2. A process according to claim 1 in which said hydroxide contains both manganese and iron ions.

3. A process according to claim 1 in which said hydroxide is at least partly magnesium hydroxide.

4. A process according to claim 1 in which said hydroxide is at least partly magnesium hydroxide containing positive cobaltous ions.

5. A process according to claim 1 in which said hydroxide is at least partly magnesium hydroxide and in which said reacting is with a water soluble silver salt and a water soluble cobalt salt.

6. A process according to claim 1 in which the electrolyte contains an organic blue dye which mordants to the hydroxide image but does not mordant to the photoconductor.

7. A process according to claim 1 in which subsequent to the image depositing step and prior to the reacting step, the image and photoconductive layer are treated with an organic blue dye which mordants to the hydroxide image but does not mordant to the photoconductor.

8. A process according to claim 1 in which an organic blue dye which mordants with the image, which is compatible with the silver salt and which does not mordant to the photoconductor, is applied with the silver salt.

9. In a photoconductographic process in which an image pattern of variations in electrical conductivity is produced in a hydrophobic zinc oxide layer, the steps comprising placing the layer in electrical contact with an electrolyte containing manganese ions, passing direct current through the layer and electrolyte, distributed in accordance with said pattern to deposit manganese hydroxide imagewise on the layer and lithoprinting from the image-bearing layer.

10. A process according to claim 9 in which the electrolyte contains both manganese and iron ions and in which the deposited image contains manganese hydoxide and iron hydroxide.

11. A process according to claim 9 in which said electrolyte contains both manganese ions and magnesium ions and both manganese hydroxide and magnesium hydroxide are deposited image-wise on the layer.

12. In a photoconductographic process in which an image pattern of variations in electrical conductivity is produced in a photoconductive layer, the steps comprising placing the layer in electrical contact with an electrolyte containing manganese, passing direct current through the layer and electrolyte, distributed in accordance with said pattern to deposit an imagewise distribution of manganese hydroxide, oxidizing it to manganese dioxide, and placing a layer containing a colorlesss dye in contact with the manganese dioxide image to oxidize the colorless dye to a colored one.

13. In a photoconductographic process in which an image pattern of variations in electrical conductivity is produced in a photoconductive layer, the steps comprising placing the layer in electrical contact with an electrolyte containing manganese and iron ions, passing direct current through the layer and electrolyte, distributed in accordance with said pattern to deposit a manganese hydroxide-iron hydroxide complex.

14. A process according to claim 13 in which the complex hydroxide image is treated with a solution containing silver ions.

15. A process according to claim 13 in which the photoconductive layer is a hydrophobic one and including the additional step of lithoprinting from the layer bearing the complex hydroxide image.

16. In a photoconductographic process in which an image pattern of variations in electrical conductivity is produced in a photoconductive layer, the steps comprising placing the layer in electrical contact with an electrolyte containing magnesium and manganese ions, passing direct current through the layer as cathode and the electrolyte distributed in accordance with said pattern to deposit a magnesium hydroxide-manganese hydroxide image and reacting said image with a water soluble silver salt.

17. A process according to claim 16 in which the electrolyte also contains ions selected from the group consisting of cobaltous and iron.

18. A process according to claim 16 in which said reacting is with a solution of water soluble silver salt and a water soluble cobalt salt.

19. In a photoconductive process in which an image pattern of variations in electrical conductivity is produced in a photoconductive layer, the steps comprising placing the layer in electrical contact with an electrolyte containing magnesium, cobaltous and manganese ions, passing direct current through the layer as cathode and the electrolyte distributed in accordance with said pattern to deposit a magnesium hydroxide-manganese hydroxide-cobaltous hydroxide image and reacting said image with a water soluble silver salt.

20. A process according to claim 19 in which the electrolyte contains between 0.05 and 5% by weight of manganese nitrate, between 0.025 and 1% by weight of cobalt nitrate and less than 10% by weight of magnesium nitrate.

21. A process according to claim 19 in which the water soluble silver salt is silver nitrate in a 0.5 to 20% by weight of water solution.

22. A process according to claim 19 in which the electrolyte contains an organic blue dye which mordants to the hydroxide image but does not mordant to the photoconductor.

23. A process according to claim 19 in which subsequent to the image depositing step and prior to the reacting step, the image and photoconductive layer are treated with an organic blue dye which mordants to the hydroxide image but does not mordant to the photoconductor.

24. A process according to claim 19 in which an organic blue dye which mordants with the image, which is compatible with the silver salt and which does not mordant to the photoconductor, is applied with the silver salt.

25. A photoconductographic print comprising a photoconductor and on the surface thereof an image consisting essentially of magnesium hydroxide and a silver-cobalt-manganese dioxide complex.

26. A photoconductive print comprising a photoconductor and on the surface thereof an image including a silver-cobalt-manganese dioxide complex and a blue organic dye which does not mordant to the photoconductor.

No references cited.

WINSTON A. DOUGLAS, *Primary Examiner.*